United States Patent
Shen et al.

(10) Patent No.: US 10,804,170 B2
(45) Date of Patent: Oct. 13, 2020

(54) DEVICE/HEALTH OF LINE (HOL) AWARE EBEAM BASED OVERLAY (EBO OVL) STRUCTURE

(71) Applicant: GLOBALFOUNDRIES INC., Grand Cayman (KY)

(72) Inventors: Hongliang Shen, Ballston Lake, NY (US); Guoxiang Ning, Clifton Park, NY (US); Erfeng Ding, Clifton Park, NY (US); Dongsuk Park, Mechanicville, NY (US); Xiaoxiao Zhang, Clifton Park, NY (US); Lan Yang, Ballston Lake, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/298,309

(22) Filed: Mar. 11, 2019

(65) Prior Publication Data

US 2020/0294868 A1    Sep. 17, 2020

(51) Int. Cl.
| | |
|---|---|
| H01L 21/66 | (2006.01) |
| H01L 27/02 | (2006.01) |
| H01L 27/088 | (2006.01) |
| G06F 30/20 | (2020.01) |
| G06F 30/398 | (2020.01) |
| G06F 111/04 | (2020.01) |
| G06F 111/20 | (2020.01) |

(52) U.S. Cl.
CPC .............. *H01L 22/32* (2013.01); *G06F 30/20* (2020.01); *G06F 30/398* (2020.01); *H01L 27/0207* (2013.01); *H01L 27/0886* (2013.01); *G06F 2111/04* (2020.01); *G06F 2111/20* (2020.01)

(58) Field of Classification Search
CPC . H01L 2224/32225; H01L 2224/48227; G03F 7/70633; G06F 30/392
USPC .................................... 438/401; 716/52, 55
See application file for complete search history.

(56) References Cited

U.S. PATENT DOCUMENTS

| | | | | |
|---|---|---|---|---|
| 5,625,288 | A * | 4/1997 | Snyder | G01R 31/2858 324/73.1 |
| 6,093,932 | A * | 7/2000 | Nakajima | B82Y 10/00 250/492.22 |
| 9,093,458 | B2 | 7/2015 | Amir et al. | |
| 9,214,317 | B2 | 12/2015 | Shur | |
| 9,230,867 | B2 | 1/2016 | Cheng et al. | |
| 9,672,311 | B2 | 6/2017 | Hamouda | |
| 9,904,753 | B2 | 2/2018 | Kim et al. | |
| 9,934,939 | B2 | 4/2018 | Kim et al. | |

(Continued)

FOREIGN PATENT DOCUMENTS

KR    20160116285    10/2016

*Primary Examiner* — Jonathan Han
(74) *Attorney, Agent, or Firm* — Anthony Canale; Andrew M. Calderon; Roberts Calderon Safran & Cole, P.C.

(57) ABSTRACT

The present disclosure relates to a method which includes generating a device layout of an eBeam based overlay (EBO OVL) structure with a minimum design rule, simulating a worst case process margin for the generated device layout of the EBO OVL structure, enabling a plurality of devices for the simulated worst case process margin for the generated device layout of the EBO OVL structure, and breaking a plurality of design rules for the enabled plurality of devices of the EBO OVL structure to generate an OVL measurement layout of the EBO OVL structure.

14 Claims, 6 Drawing Sheets

(56) References Cited

U.S. PATENT DOCUMENTS

2009/0212793 A1\* 8/2009 Guldi .................. H01L 22/20
324/762.05

\* cited by examiner

DEVICE/HEALTH OF LINE (HOL) AWARE EBEAM BASED OVERLAY (EBO OVL) STRUCTURE

FIELD OF THE INVENTION

The present disclosure relates to an integrated overlay structure, and more particularly, to a device and a method for using a device/health of line (HOL) aware eBeam based overlay (EBO OVL) structure.

BACKGROUND

Accuracy of current optical overlay (OVL) measurement is a major challenge. OVL is very critical for 14 nm and greater technology. A large number of failures in semiconductor technology are related to a multiple layer OVL issue (e.g., source/drain connection is sensitive to an overlay mark for data collection). One of the issues in current optical overlay (OVL) measurements is a physical distance between an overlay (OVL) mark and the real devices/logics/circuits.

In conventional technology, the focus is on integrating part of a function of an integrated circuit to assist process control. However, in this approach, it takes a large chip area to implement and can only be placed in frame or dummy prime areas. Further, under this approach, shrinking the integrated circuit is difficult due to a resolution of optical tools. In addition, when using different OVL measurement methods, a delta can develop such that the measurement methods do not correspond with each other. Further, there is very limited methods to calibrate an OVL measurement and there is no integrated EBO OVL structure which can get all critical layers OVL within one structure. In particular, in conventional technology, the layout needs to be continually checked to find a proper structure because current OVL measurements can only be accomplished for a specific layer. Further, it is difficult to correlate OVL to different structures because the structures are all separated (i.e., contamination free manufacturing (CFM), electronic testing (ET), health of line (HOL), device, etc.)

As semiconductor technology continues to progress to smaller feature sizes, layout placement becomes more stringent and the OVL marks/measuring structures are expected to take less wafer area. In particular, an OVL measurement method and structure is desired for monitoring and controlling in-chip OVL with less silicon area.

SUMMARY

In an aspect of the disclosure, a device includes a semiconductor structure, and an eBeam based overlay (EBO OVL) structure which is an active device of the semiconductor structure and is structured to measure at least one of process variations and structures of the semiconductor device.

In another aspect of the disclosure, a method includes generating a device layout of an eBeam based overlay (EBO OVL) structure with a minimum design rule, simulating a worst case process margin for the generated device layout of the EBO OVL structure, enabling a plurality of devices for the simulated worst case process margin for the generated device layout of the EBO OVL structure, breaking a plurality of design rules for the enabled plurality of devices of the EBO OVL structure to generate an OVL measurement layout of the EBO OVL structure, performing a health of line (HOL) test of a semiconductor device using the generated OVL measurement layout of the EBO OVL structure, generating a systematic staircase device aware eBeam based overlay (EBO) structure based on the generated OVL measurement layout of the EBO OVL structure, and the EBO OVL structure is on a scribe line of the semiconductor device.

In another aspect of the disclosure, a method includes generating a device layout of an eBeam based overlay (EBO OVL) structure with a minimum design rule, simulating a worst case process margin for the generated device layout of the EBO OVL structure, enabling a plurality of devices for the simulated worst case process margin for the generated device layout of the EBO OVL structure, and breaking a plurality of design rules for the enabled plurality of devices of the EBO OVL structure to generate an OVL measurement layout of the EBO OVL structure.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to an integrated overlay structure, and more particularly, to a device and a method for using a device/health of line (HOL) aware eBeam based overlay (EBO OVL) structure. More specifically, the present disclosure uses an integrated EBO OVL structure which can be implemented in all critical design layers and which can be an active device. In addition, the integrated EBO OVL structure can be device and health of line (HOL) tested. The integrated EBO OVL structure can link inline OVL, critical dimensional scanning electron microscope (CDSEM) OVL, inline defect scan, failure analysis (FA) cut, and final device/ HOL performance together. The integrated EBO OVL structure can also consider a FinFET isolation connection, failure analysis (FA) sensitivity, and the number of FINs when determining measurements in a device. The integrated EBO OVL structure can also be used to calibrate a normal optical OVL measurement accuracy and can be designed with a small area in order to be placed on a scribe line or a prime die.

In conventional technology, an unlanded trench silicide (TS) can be caused by the gate region (PC) or the trench block (TB) OVL shift. Further, the TS to PC short can be caused by the TB OVL shift. In the conventional technology, an optical method is used to inspect an OVL mark; however, since the overlay (OVL) mark in the conventional technology cannot be controlled, the yield of semiconductor devices is greatly reduced.

In the present disclosure, an improved method generates a symmetric EBO structure which is device aware. In particular, the method of generating the EBO structure considers symmetric FIN reservation layout (i.e., left/right, up/down, etc.) In a symmetric area, different number of FINs (i.e., 1, 2, 4, 6, 8, etc. . . . ) and an etch loading effect, such as the length of trench silicide (TS), different type of transistors (i.e., NFET, PFET, regular voltage threshold (RVT)/high voltage threshold (HVT)/low voltage threshold (LVT), etc.), together with other process margin effects, are considered. Different types of transistors are also considered in symmetric staircase structures in which certain design rules need to be broken to ensure capability of the EBO OVL measurements. For example, single diffusion break devices (so called SDB with reticle layer named RB) and PC design rules can be broken to measure the gate region (PC) to fin cut layer (RC) overlay (OVL). Further, as opposed to the conventional technology in which an optical method is used, the symmetric EBO structure uses actual devices to design the overlay (OVL) mark.

In the present disclosure, an EBO structure may be designed such that a contact may make a connection on the gate and source/drain area. The EBO structure can also be duplicated to form a larger array for multiple monitoring devices, similar to a static random access memory (SRAM) bitcell extension. The duplicative EBO periodic structure can be configured to incorporate more device cells/functions to allow more windows for viewing portions of the real logic circuits. As an example, the duplicative EBO periodic structure may be small (i.e., less than 5 µm by 5 µm) to be uniformly swapped to intra-field frame and prime for EBO model builds and dose or focus intra-field monitoring.

The EBO structure of the present disclosure can improve the yield which is caused by source/drain disconnection or poor connections with the contact. Further, the EBO structure is a small size and can be placed anywhere in a device (e.g., a scribe line or a prime die). The EBO structure can also link inline overlay (OVL), critical dimension scanning electron microscope overlay (CDSEM OVL), inline defect scan, failure analysis (FA) cut and final device/health of line (HOL) performance together. Thus, the EBO structure can perform critical dimensions (CD) measurements, critical dimension scanning electron microscope overlay (CDSEM OVL), a device test, and a health of line (HOL) test in an integrated structure to determine an EBO OVL. In contrast, CD measurements are conventionally performed in a CD Box/In die critical location; whereas a critical dimension scanning electron microscope overlay (CDSEM OVL) is conventionally performed in a random structure; a device test is conventionally performed on a device macro; and a health of line (HOL) test is conventionally performed on a HOL structure.

Figure 1:
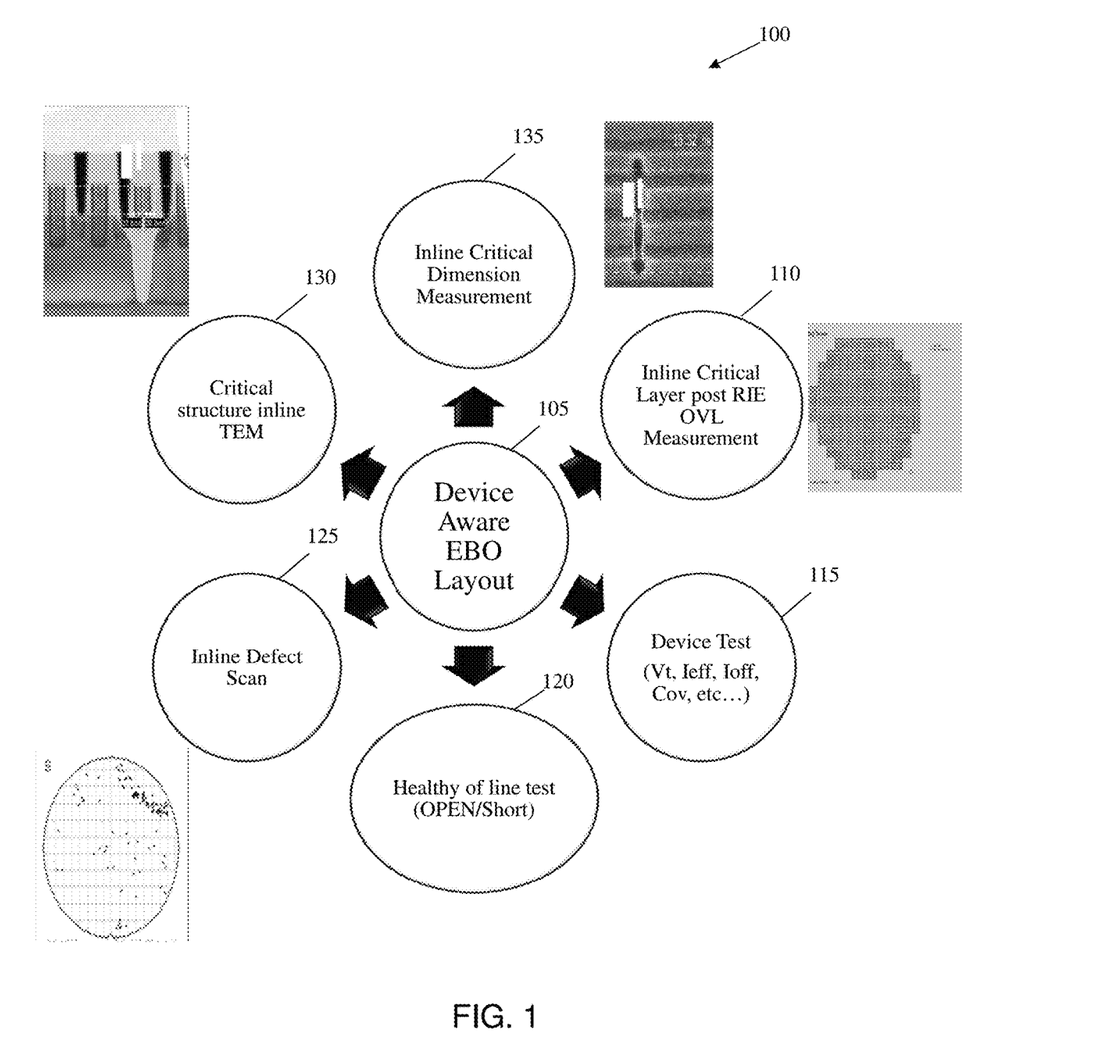
FIG. 1 shows a device aware EBO layout usage in accordance with aspects of the present disclosure.

FIG. 1 shows a device aware EBO layout usage 100 in accordance with aspects of the present disclosure. In FIG. 1, the device aware EBO layout structure 105 can be used in the performance of several functions on a semiconductor device. These functions include inline critical layer post reactive ion etching (RIE) overlay (OVL) measurements 110, device testing 115 (i.e., threshold voltage Vt, effective current Ieff, off current Ioff, etc.), health of line (HOL) tests 120 by opening/shorting, inline defect scan 125, critical structure inline transmission electron microscopy (TEM) 130, and inline critical dimension (CD) measurements 135. As shown in FIG. 1, the inline critical layer post RIE OVL measurement 110, the inline defect scan 125, and the critical structure inline TEM 130 have example photos/diagrams which correspond to the measurements/tests.

Still referring to FIG. 1, the device aware EBO layout structure 105 can link the inline overlay (OVL), the inline transmission electron microscopy (TEM), the critical dimension scanning electron microscopy (CDSEM), and final device/health of line (HOL) performance together using a single structure. In other words, the device aware EBO layout structure 105 can be implemented on a single structure for all of the measurements above to correlate the measurements for a semiconductor device. As an example, in the device aware EBO structure 105, the end user can correlate device/health of line (HOL) tests to inline critical dimensions (CD)/overlay (OVL) on the exact same location. Further, the device aware EBO structure 105, can be placed inside the prime die, scribe line, or close to an optical OVL mark (i.e., for OVL mark calibration purposes) of the semiconductor device.

Figure 2:
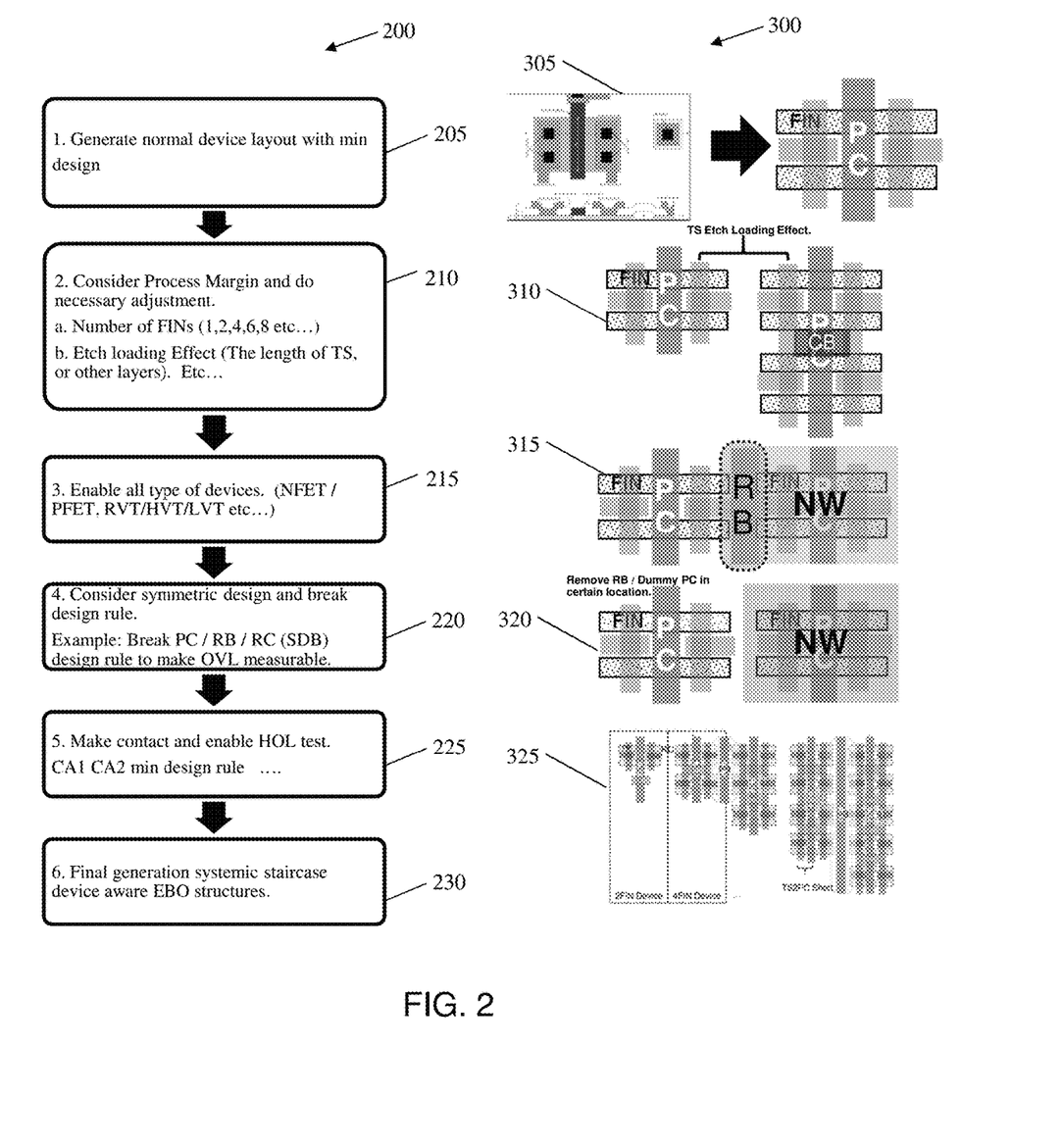
FIG. 2 shows a design flow and corresponding example layout in accordance with aspects of the present disclosure.

FIG. 2 shows a design flow and corresponding example layout in accordance with aspects of the present disclosure. In FIG. 2, the design flow 200 of the present disclosure will allow generation of a system staircase device aware EBO structure 325. In order to generate the system staircase device aware EBO structure 325, a normal device layout 305 with a minimum design rule is generated in step 205. As shown in the corresponding example layout 300, the normal device layout 305 is generated with minimum design rules. In step 210, in fabricating the normal device layout 305, a designer will consider a process margin and make necessary adjustments to generate a device layout 310. In particular, in step 210, the normal device layout 310 will take into consideration the number of FINs (i.e., 1, 2, 4, 6, 8, etc.) and an etch loading effect (i.e., the length of a trench silicide (TS) and other layers), as examples. As shown in the corresponding example layout 300, the process margin and necessary adjustments are shown in the device layout 310 in which a trench silicide (TS) is lengthened to determine electrical characteristics.

In step 215, the device layout 310 can be used to enable all types of devices (NFET/PFET, RVT/HVT/LVT, etc.) to generate an enabled design layout 315. As shown in the corresponding example layout 300, the enabled device layout 315 includes a single diffusion break (RB), a dummy gate region (PC), and other devices to determine how different devices will affect shorting. In step 220, a symmetric design is considered and the conventional design rules are broken. For example, the enabled device layout 315 can break the dummy gate region (PC), the single diffusion break (RB), and the fin cut layer (RC) design rules to make the overlay (OVL) measurable (i.e., measure distance of PC to RB for overlay) to generate an OVL measurable device layout 320. As shown in the corresponding example layout 300, the OVL measureable device layout 320 has the RB and dummy PC removed.

In step 225, contacts (e.g., CA1 and CA2) are made at the gate, source, drain, etc., to enable a health of line (HOL) test. In particular, the contact layers CA1 and CA2 are made using a minimum design rule. These contacts can then be used to test the device, e.g., HOL test. In step 230, the final generation system staircase device aware EBO structure 325 is created by scaling the OVL measurable device layout 320. As shown in the corresponding example layout 300, the system staircase device aware EBO structure 325 is a scaled up version of the OVL measurable device layout 320.

Figure 3:
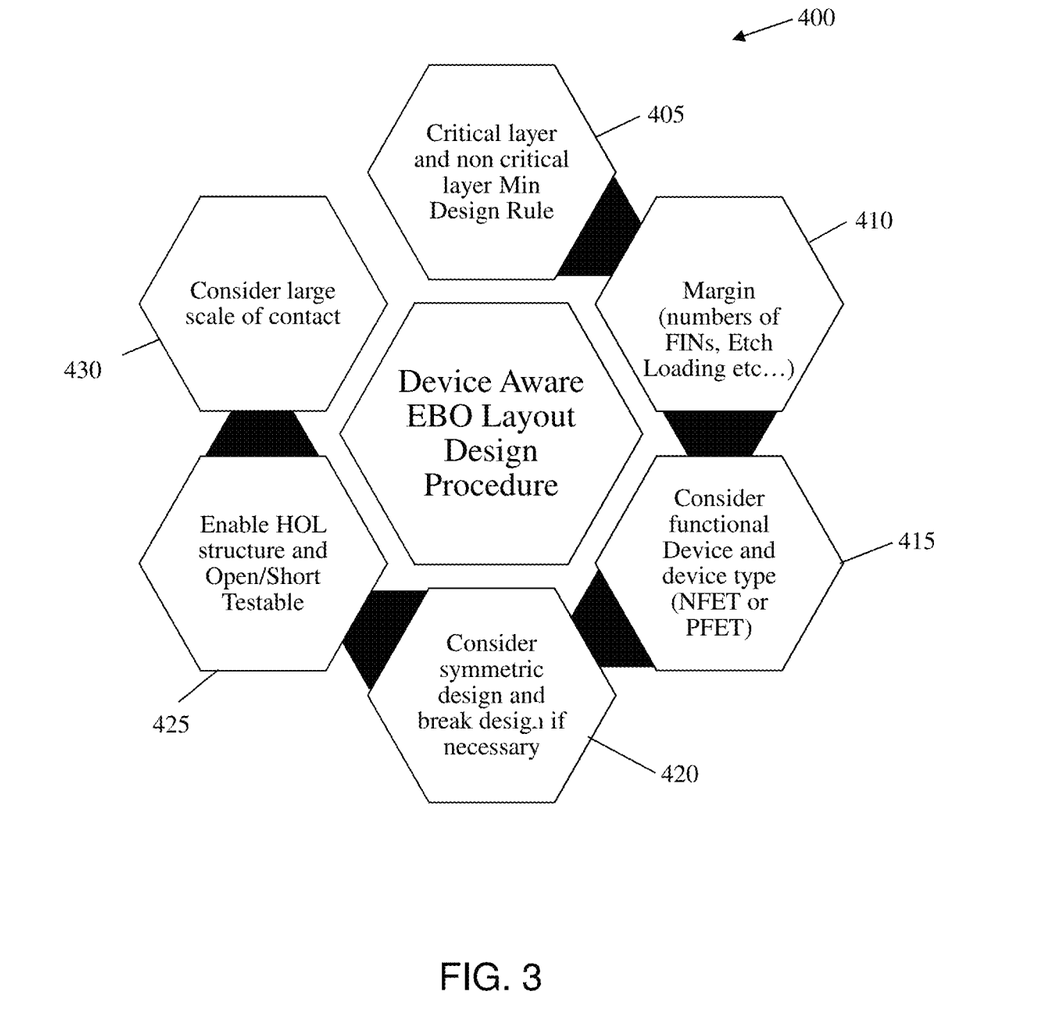
FIG. 3 shows a device aware EBO layout design procedure in accordance with aspects of the present disclosure.

FIG. 3 shows a device aware EBO layout design procedure in accordance with aspects of the present disclosure. In FIG. 3, the device aware EBO layout design procedure 400 will allow generation of a system staircase device aware EBO structure. In the device aware EBO layout design procedure 400, the normal device layout is generated using a minimum design rule for the critical layers and the non-critical layers in step 405. The critical layers can include a fin region FN, a fin cut layer RC, a fin preservation layer RX, a gate region PC, a Gate cut layer CT, trench contacts TB, TT, and contact layers CA1, CA2, CB1, CB2. The non-critical layers can include implant layers NW, BF, IN, IP, BV, CV, LW, XW, GN, and GP which all used for different device threshold voltage flavors.

In step 410, the process margin is considered for the normal device layout (i.e., number of FINs, etch loading, etc.). In particular, the worst case for the process margin of the normal design layout is simulated using design tools. For example, the number of FINs are simulated/considered for the process margin of the normal design layout because the number of FINs are critical for device performance and a downstream process margin (i.e., 2 FINs, 4 FINs, etc.). Further, the etch loading effect (i.e., pattern density, structure size, etc.) is also simulated/considered to find the worst case scenario for the process margin of the normal design layout and adjustments are made to generate a design layout. In step 415, the functional device and device type are considered (i.e., NFET or PFET) for the design layout. In particular, in step 415, the normal device layout design is used when considering different types of devices, such as NFET and PFET, FIN numbers, gate length/width, single diffusion break/double diffusion break, etc., for the design layout.

In step 420, a symmetric design is considered and design rules are broken to generate an OVL measurable device layout. For example, some design rules may need to be broken to enable overlay (OVL) measurements for the OVL measurable device layout. For example, in the device aware EBO layout procedure, the single diffusion break (RB) and the gate region (PC) design rules may be broken to make the gate region (PC) to the fin cut layer (RC) overlay (OVL) testable. In step 425, the heath of line (HOL) is enabled and open/short is tested. In particular, a design contact is included to connect gate and source/drain to aid with the HOL testing. In step 430, the scale of contact can be increased to generate a system staircase device aware EBO structure. More specifically, the OVL measurable device layout can be repeated to form a large scale structure (i.e., the system staircase device aware EBO structure) and make the health of line (HOL) test effective.

Figure 4:
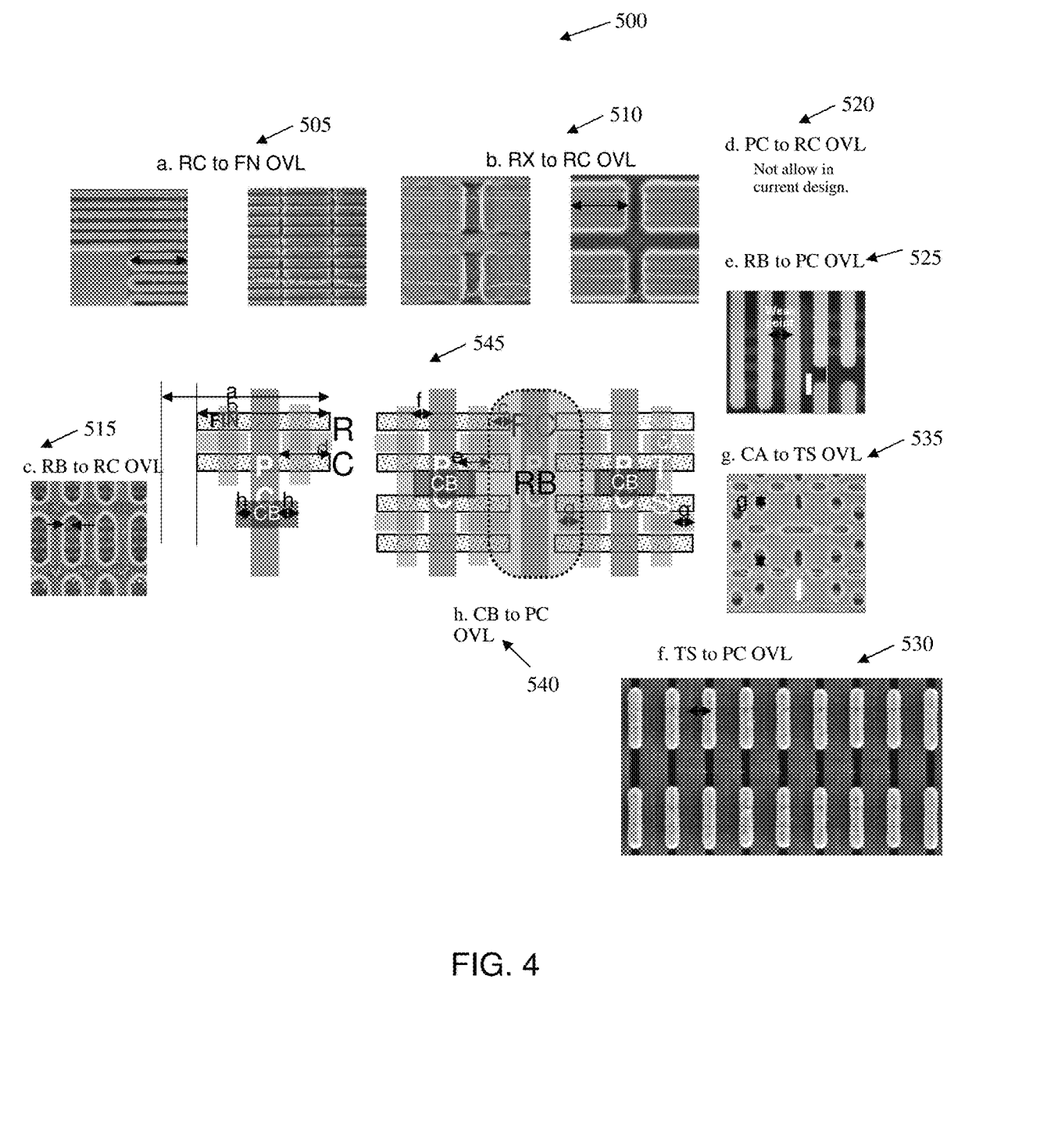
FIG. 4 shows a device aware EBO design example in accordance with aspects of the present disclosure.

FIG. 4 shows a device aware EBO design example in accordance with aspects of the present disclosure. In particular, the device aware EBO design example 500 includes a fin cut layer (RC) to fin layer (FN) overlay (OVL) measurement 505 (represented by "a" measurement), a fin preservation layer (RX) to fin cut layer (RC) overlay (OVL) measurement 510 (represented by "b" measurement), a single diffusion break (RB) to the fin cut layer (RC) overlay (OVL) measurement 515 (represented by "c" measurement), a gate region (PC) to the fin cut layer (RC) overlay (OVL) measurement 520 (represented by "d" measurement), a single diffusion break (RB) to the gate region (PC) overlay (OVL) measurement 525 (represented by "e" measurement), a transistor silicide (TS) to the gate region (PC) overlay (OVL) measurement 530 (represented by "f" measurement), a contact layer (CA) to the gate region (PC) overlay (OVL) measurement 535 (represented by "g" measurement), and a connecting gate (CB) to the gate region (PC) overlay (OVL) measurement 540 (represented by "h" measurement). The measurements "a" through "h" are shown in FIG. 4 as being measured by critical dimension scanning electron microscope (CDSEM) for reference numerals 505-540.

In FIG. 4, a device aware EBO layout structure 545 of the present disclosure can perform all of the measurements "a" through "h" by being placed inside a prime die, scribe line, or close to an optical OVL mark of a semiconductor device as representedly shown in FIG. 4. Therefore, the device aware EBO layout structure 545 can perform all critical dimension (CD) measurements for all critical layer overlays (OVLs). In particular, the device aware EBO layout structure 545 includes measurements "a", "b", "c", "d", "e", "f", "g", and "h" (as indicated by the arrows in the device aware EBO layout structure 545). An EBO OVL mark of the EBO layout structure 545 can be a good indicator for inline OVL monitoring (from either lithography or etching). Further, the device aware EBO layout structure 545 is device and HOL testable. In particular, the device aware EBO layout structure 545 can link inline OVL, CDSEM OVL, and final device/HOL performance together in one structure. Further, the device aware EBO layout structure 545 is not just a conventional/typical device macro because the device aware EBO layout structure 545 measures all critical CD/OVL by breaking design rules. Further, the device aware EBO layout structure 545 is compatible with CDSEM measurements.

The EBO layout structure 545 of the present disclosure can improve an overlay model and measurements to improve an electrical device. In particular, the EBO layout structure 545 can correlate with an optical overlay, pass the measurements to a lithography process to calibrate, correlate with an electrical environment to improve overlay issues, measure critical dimensions (i.e., gate, FIN, etc.) to improve performance to ensure in-process control and ensure uniformity for similar devices, and improve inline monitoring for CD measurements. Further, the EBO layout structure 545 of the present disclosure can take measurement of actual electrical devices, which is different from the conventional technology which merely relies on optical measurements.

Figure 5:
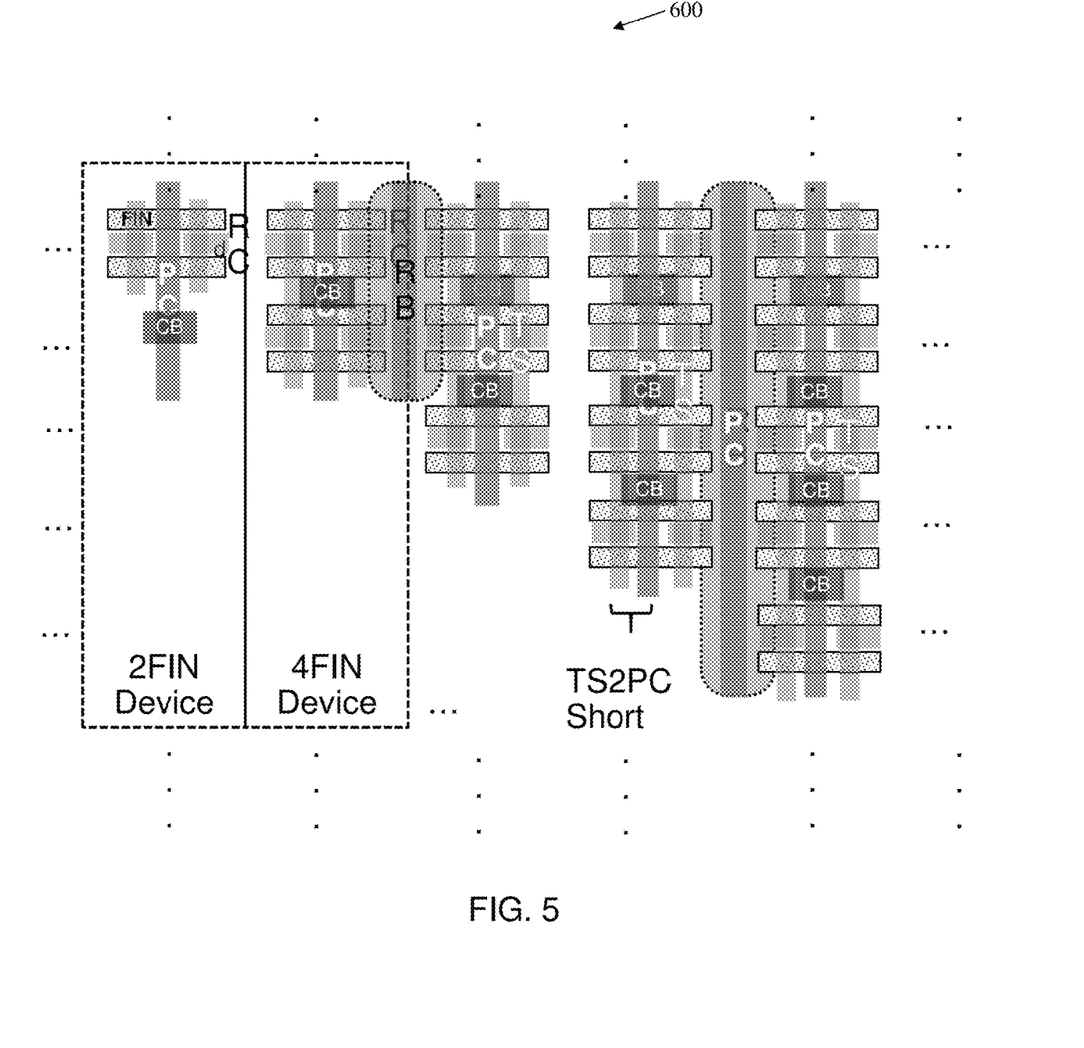
FIG. 5 shows a large scale EBO design example in accordance with aspects of the present disclosure.

FIG. 5 shows a scaled EBO design example in accordance with aspects of the present disclosure. Specifically, FIG. 5 shows a scaled-up structure 600 of the EBO layout structure 545. As shown in FIG. 5, the scaled-up structure 600 can include a two FIN device, a four FIN device (although not limited to 2 or 4 Fins), and a TS2PC short (i.e., trench silicide TS to gate region PC short), although other design examples are contemplated by the present disclosure. The scaled-up structure 600 is used for inline defect monitoring, environmental device monitoring, and health of line (HOL) testing. In particular, the scaled up structure 600 improves the accuracy of the HOL testing and inline defect monitoring when testing multiple semiconductor devices.

Figure 6:
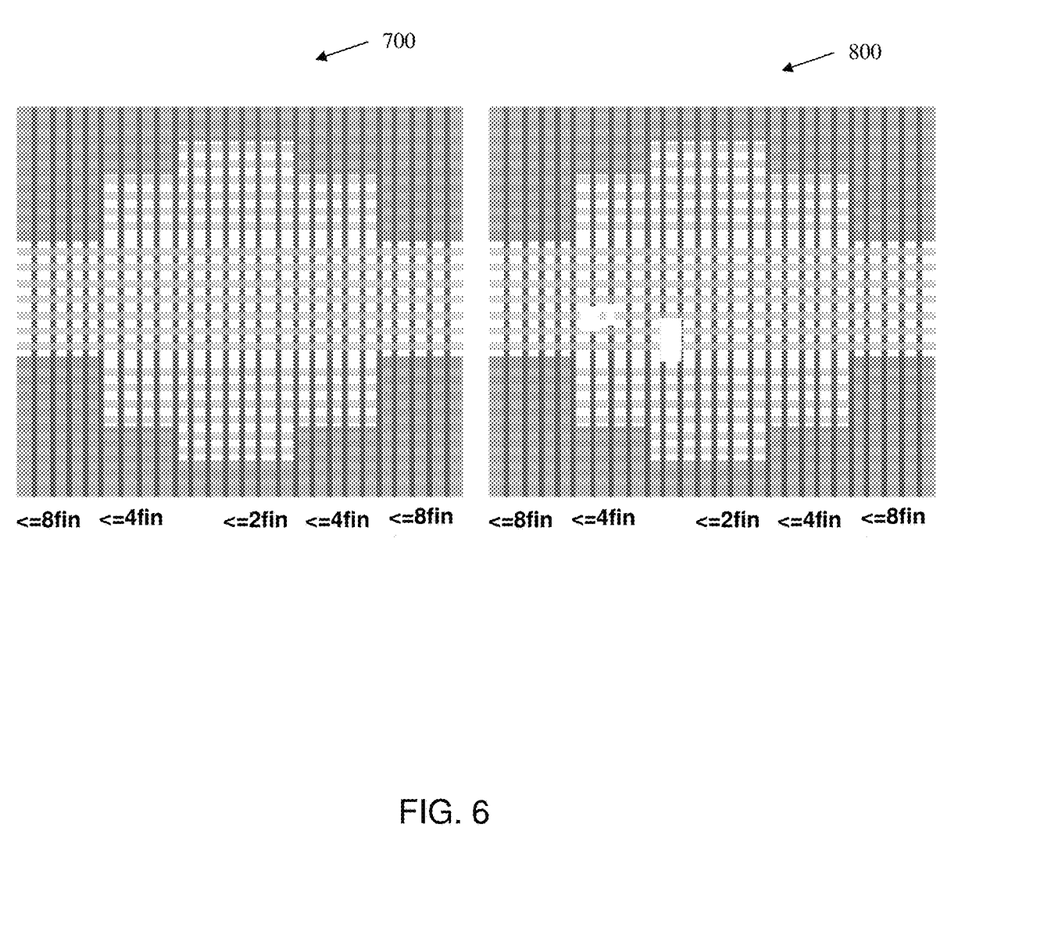
FIG. 6 shows another design example in accordance with aspects of the present disclosure.

FIG. 6 shows another design example in accordance with aspects of the present disclosure. Specifically, FIG. 6 shows a PFET design 700 which includes a fin layer FN, a fin preservation layer RX, and a gate region PC and a NFET design 800 which also includes the fin layer FN, the fin preservation layer RX, and the gate region PC. The PFET design 700 and the NFET design 800 are device based EBO structures which are designed as a large macro to enable health of line (HOL) testing. Further, the PFET design 700 and the NFET design 800 can include a systematic staircase FIN reservation which has a specific number of FINs (i.e., 2 FINs, 4 FINs, 8 FINs, etc.) In addition, more segments can be added on the target of the PFET design 700 and the NFET design 800 to improve and increase the accuracy of the OVL measurements. Also, the size of the target can be reduced for production once the minimum required size of the target is achieved.

The device and method for using a device/health of line (HOL) aware eBeam based overlay (EBO OVL) structure of the present disclosure can be manufactured in a number of ways using a number of different tools. In general, though, the methodologies and tools are used to form structures with dimensions in the micrometer and nanometer scale. The methodologies, i.e., technologies, employed to manufacture the device and method for using a device/health of line (HOL) aware eBeam based overlay (EBO OVL) structure of the present disclosure has been adopted from integrated circuit (IC) technology. For example, the structures are built on wafers and are realized in films of material patterned by photolithographic processes on the top of a wafer. In particular, the fabrication of the circuit and the method for using a device/health of line (HOL) aware eBeam based overlay (EBO OVL) structure uses three basic building blocks: (i) deposition of thin films of material on a substrate, (ii) applying a patterned mask on top of the films by photolithographic imaging, and (iii) etching the films selectively to the mask.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method, comprising:
    generating a device layout of an eBeam based overlay (EBO OVL) structure with a minimum design rule;
    simulating a worst case process margin for the generated device layout of the EBO OVL structure;
    enabling a plurality of devices for the simulated worst case process margin for the generated device layout of the EBO OVL structure; and
    breaking a plurality of design rules for the enabled plurality of devices of the EBO OVL structure to generate an OVL measurement layout of the EBO OVL structure.

2. The method of claim 1, further comprising performing a health of line (HOL) test of a semiconductor device using the generated OVL measurement layout of the EBO OVL structure.

3. The method of claim 1, further comprising generating a systematic staircase device aware eBeam based overlay (EBO) structure based on the generated OVL measurement layout of the EBO OVL structure.

4. The method of claim 1, wherein the worst case process margin is simulated by determining a number of FINs and an etch loading effect for the generated device layout of the EBO OVL structure.

5. The method of claim 4, further comprising performing adjustments to the number of FINs and the etch loading effect based on the simulated worst case process margin.

6. The method of claim 1, wherein the EBO OVL structure is a device based EBO macro.

7. The method of claim 1, wherein the breaking the plurality of design rules for the enabled plurality of devices of the EBO OVL structure comprises breaking at least one of a dummy gate region (PC) design rule, a single diffusion break (RB) design rule, and a fin cut layer (RC) design rule.

8. A method, comprising:
    generating a device layout of an eBeam based overlay (EBO OVL) structure with a minimum design rule;
    simulating a worst case process margin for the generated device layout of the EBO OVL structure;
    enabling a plurality of devices for the simulated worst case process margin for the generated device layout of the EBO OVL structure;
    breaking a plurality of design rules for the enabled plurality of devices of the EBO OVL structure to generate an OVL measurement layout of the EBO OVL structure;
    performing a health of line (HOL) test of a semiconductor device using the generated OVL measurement layout of the EBO OVL structure; and
    generating a systematic staircase device aware eBeam based overlay (EBO) structure based on the generated OVL measurement layout of the EBO OVL structure,
    wherein the EBO OVL structure is on a scribe line of the semiconductor device.

9. The method of claim 8, wherein the worst case process margin is simulated by determining a number of FINs and an etch loading effect for the generated device layout of the EBO OVL structure.

10. The method of claim 9, further comprising performing adjustments to the number of FINs and the etch loading effect based on the simulated worst case process margin.

11. The method of claim 8, wherein the EBO OVL structure is a device based EBO macro.

12. The method of claim 8, wherein the breaking the plurality of design rules for the enabled plurality of devices of the EBO OVL structure comprises breaking at least one of a dummy gate region (PC) design rule, a single diffusion break (RB) design rule, and a fin cut layer (RC) design rule.

13. The method of claim 8, the EBO OVL structure is an active device of the semiconductor device.

14. The method of claim 8, wherein the HOL test is used to extract open/short performance of the semiconductor device.

* * * * *